United States Patent
Schoor et al.

(10) Patent No.: US 9,715,014 B2
(45) Date of Patent: Jul. 25, 2017

(54) ANTENNA ARRAY, RADAR SYSTEM, VEHICLE AND METHOD

(71) Applicant: Robert Bosch GmbH, Stuttgart (DE)

(72) Inventors: Michael Schoor, Stuttgart (DE); Goetz Kuehnle, Hemmingen (DE); Volker Gross, Ditzingen (DE); Benedikt Loesch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 330 days.

(21) Appl. No.: 14/597,446

(22) Filed: Jan. 15, 2015

(65) Prior Publication Data

US 2015/0198704 A1    Jul. 16, 2015

(30) Foreign Application Priority Data

Jan. 16, 2014  (DE) .................. 10 2014 200 690

(51) Int. Cl.
| | |
|---|---|
| *G01S 13/06* | (2006.01) |
| *G01S 13/93* | (2006.01) |
| *G01S 13/42* | (2006.01) |
| *H01Q 1/32* | (2006.01) |
| *H01Q 3/26* | (2006.01) |
| *H01Q 25/00* | (2006.01) |

(52) U.S. Cl.
CPC .......... *G01S 13/931* (2013.01); *G01S 13/424* (2013.01); *H01Q 1/3233* (2013.01); *H01Q 3/26* (2013.01); *H01Q 25/00* (2013.01); *G01S 2013/9375* (2013.01)

(58) Field of Classification Search
CPC ................ G01S 13/424; G01S 13/931; G01S 2013/9375; H01Q 1/3233; H01Q 25/00; H01Q 3/26
USPC .......................................... 342/147
See application file for complete search history.

(56) References Cited

U.S. PATENT DOCUMENTS

| | | | |
|---|---|---|---|
| 2008/0272956 A1* | 11/2008 | Pedersen | G01S 7/35 342/107 |
| 2012/0256795 A1 | 10/2012 | Tajima | |
| 2015/0198709 A1* | 7/2015 | Inoue | G01S 13/28 342/147 |

* cited by examiner

*Primary Examiner* — Timothy A Brainard
(74) *Attorney, Agent, or Firm* — Norton Rose Fulbright US LLP; Gerard Messina

(57) ABSTRACT

An antenna array, particularly for a radar system, having first antenna elements which are situated in a horizontal direction in a plane and which are developed to receive a first radio signal, having second antenna elements which are each situated above or below the horizontally situated first antenna elements and which are developed to receive the first radio signal, and having a processing device which is developed to calculate an azimuth angle and an angle of elevation of an object, that is located in front of the antenna array, from the radio signal received by the first antenna elements and from the radio signal received by the second antenna elements. Also described is a radar system, a vehicle and a method.

20 Claims, 8 Drawing Sheets

ANTENNA ARRAY, RADAR SYSTEM, VEHICLE AND METHOD

RELATED APPLICATION INFORMATION

The present application claims priority to and the benefit of German patent application no. 10 2014 200 690.2, which was filed in Germany on Jan. 16, 2014, the disclosure of which is incorporated herein by reference.

FIELD OF THE INVENTION

The present invention relates to an antenna array, particularly for a radar system, a radar system, a vehicle and a method.

BACKGROUND INFORMATION

Even though the present invention is described below in connection with radar systems for vehicles, it is not limited to this and may be used with any radar system.

In modern vehicles, a large number of electronic systems is used, for example, if they are able to support the driver in his guidance of the vehicle. Braking assistants, for instance, are able to detect preceding traffic participants and to brake and accelerate the vehicle accordingly, so that a specified minimum distance is always maintained from the preceding traffic participants. Such braking assistants are also able to initiate emergency braking, when they detect that the distance from the preceding traffic participant is becoming too small.

In order to be able to provide such assistance systems in a vehicle, it is necessary to record data about the surroundings of the respective vehicle. In the above example of a braking assistant, it is required, for instance, to record the position of a preceding traffic participant, in order to be able to calculate the distance of one's vehicle from the preceding traffic participant.

In the detection of the position of a preceding traffic participant, the azimuth angle, for example, of the preceding traffic participant is able to be recorded, starting from the driving direction of the respective vehicle. Since functionally non-relevant objects such as manhole covers or bridges also reflect radar signals, the detection of the angle of elevation permits one to distinguish between functionally relevant and non-relevant objects.

Such a detection of the azimuth angle or angle of elevation may take place, for example, by evaluation of the phases and amplitudes of the receiving antennas of a radar system.

US document US 2012/256795 A1 shows a possible antenna for such a radar system.

For a two-dimensional antenna array having phase centers $x_i$ and $y_i$, the following equation applies for the phase on element i:

$$\varphi_i = \frac{2\pi}{\lambda}(x_i * \sin\theta * \cos\Phi + y_i * \sin\Phi)$$

where $\theta$ represents the azimuth angle and $\Phi$ the angle of elevation.

In a general two-dimensional antenna array, the azimuth angle and the angle of elevation have to be calculated jointly. Because of that, the calculating expenditure rises sharply. It is therefore desirable to decouple the calculation of the azimuth angle and the angle of elevation.

It is known to the Applicant that one should use an antenna as shown in FIG. 8, in order to enable a separate calculation of the azimuth angle and the angle of elevation for small angles of elevation ($\cos(\Phi)\approx 1$). FIG. 8 shows the positions of the receiving elements of an antenna. In this context, the four receiving elements for the calculation of the azimuth angle are situated in a horizontal plane. The two additional receiving elements for the calculation of the angle of elevation are situated in a vertical plane above the third receiving element of the horizontal plane.

To be sure, in modern radar systems for vehicles, a higher antenna gain is required in the elevation direction, in order to achieve focusing on the relevant elevation angle range, and thus to be able to fade out interferences such as road clutter.

In order to make possible a high antenna gain, the antenna elements of such an antenna need a large extension into the direction of elevation. In the case of the system of FIG. 8, this leads to a very large extension in the elevation direction. However, the greater the extension into the elevation direction, the less is the unambiguity range in the elevation angle estimation. In this context, the unambiguity range is a function of the frequency of the radar signals used. This comes about from the evaluation of the phase position of the individual receiving elements, in which the phase shift is able to amount at the most from $-\pi$ to $+\pi$. If the phase shift is greater, the signal can no longer be associated unambiguously. As a result, a greater distance of the individual receiving elements leads to a reduced unambiguity range, since the phase position shifts because of the greater distance.

SUMMARY OF THE INVENTION

The present invention describes an antenna array having the features described herein, a radar system having the features described herein, a vehicle having the features described herein and a method having the features described herein.

Accordingly, there is provided:

To calculate an antenna array, particularly for a radar system, having at least two first antenna elements, which are situated in the horizontal direction in a plane and which are developed to receive a first radio signal using at least two second antenna elements which are situated in different horizontal positions, in each case above or below the horizontally situated first antenna elements, and which are developed to receive the first radio signal, having a processing unit which is developed to calculate an azimuth angle and an angle of elevation of an object located in front of the antenna array, from the first radio signal received by the first antenna element and from the first radio signal received by the second antenna elements.

Furthermore, there is provided:

A radar system having an antenna array according to the present invention and having an electronic system which is developed to produce a first signal which is emitted by the first transmitting device as the first radio signal, and/or to produce at least one second signal, which is emitted by the at least one second transmitting device as the second radio signal.

Furthermore, there is provided:

A vehicle, particularly a motor vehicle, having a radar system according to the present invention.

Finally, there is provided:

A method for detecting an object, particularly using a radar system, having the steps of emitting a first radio signal using a first sending device, the first sending device being situated in a horizontal plane having at least two first antenna elements, receiving the radio signal using the at least two first antenna elements, receiving the radio signal using at least two second antenna elements which are situated in different horizontal positions, respectively above or below corresponding first antenna elements of the horizontally situated first antenna elements, calculating an azimuth angle and an angle of elevation of an object located in front of the first antenna elements and the second antenna elements from the radio signal received by the first antenna elements and from the second antenna elements and from the radio signal received by the second antenna elements.

The realization on which the present invention is based is that the positioning of the antenna elements for the estimation of the angle of elevation having a high antenna gain in a straight line is a disadvantage with respect to the unambiguity range.

Now, the idea on which the present invention is based is to take this realization into account and to provide a possibility for not positioning the second antenna elements in a straight line and still to make possible an exact calculation of the angle of elevation.

For this purpose, the present invention provides that the first antenna elements be situated in a horizontal plane and the second antenna elements be situated over or under the first antenna elements. In this context, the two antenna elements are not situated in a common vertical plane but rather in a manner offset laterally.

The present invention provides a processing unit which thereupon calculates both the azimuth angle and the angle of elevation from the radio signals received by the first antenna elements and from the radio signals received by the second antenna elements.

By shifting the second antenna elements in the horizontal direction, the present invention enables a high antenna gain in the elevation direction, without thereby having to accept restrictions in the vertical distances of the second antenna elements. Thus good focusing is achieved in the elevation direction.

Advantageous specific embodiments and refinements are derived from the dependent claims and the description, with reference to the figures.

In one specific embodiment, the second antenna elements are each situated in the vertical direction above or below a corresponding one of the first antenna elements, the second antenna elements being situated at various heights above or below the plane of the first antenna elements This makes it possible to place the second antenna elements very flexibly with respect to the first antenna elements.

In one specific embodiment, at least one of the second antenna elements is situated in the vertical direction next to a corresponding one of the first antenna elements. This makes it possible to place the second antenna elements very flexibly with respect to the first antenna elements.

In one specific embodiment, the antenna array has a first sending device, which is developed to emit the first radio signal, the first sending device being situated in the plane of the first antenna elements. This enables the providing of a very compact antenna array.

In one specific embodiment, the antenna array has at least one second sending device, which is developed to emit a second radio signal, the second sending device being situated in the plane of the first antenna elements at a different horizontal position than the first sending device, and the first antenna elements and the second antenna elements being developed to receive the second radio signal. This makes it possible to provide an antenna according to the MIMO Principle, which has a greater aperture and therefore yields greater accuracy.

In one specific embodiment, the processing unit is developed to calculate the azimuth angle based on the radio signal received by the first antenna elements. The processing unit is further developed to calculate the angle of elevation based on the calculated azimuth angle and the radio signal received by the first antenna elements and the radio signal received by the second antenna elements. This enables a very simple calculation of the azimuth angle and the angle of elevation building up on each other.

In one specific embodiment, the processing device is developed to calculate the azimuth angle and the angle of elevation based on the radio signal received by the first antenna elements and on the radio signal received by the second antenna elements and on a specified function of the maximum probability. This enables a very effective calculation of the azimuth angle and the angle of elevation.

The above embodiments and refinements may be optionally combined with one another, provided this is meaningful. Additional possible embodiments, refinements and implementations of the invention also include combinations, which are not explicitly named, of features of the invention described above or below with respect to the exemplary embodiment. In this context, in particular, one skilled in the art will add individual aspects as improvements or as supplements to the respective basic form of the present invention.

The present invention will be explained below in greater detail, with the aid of the exemplary embodiments given in the schematic figures of the drawings.

DETAILED DESCRIPTION

In all the figures, equal or functionally the same elements and devices are provided with the same reference symbols, provided no other information is given.

Within the scope of this Patent Application, by a radar system one should understand each system which, based on emitted and reradiated electromagnetic waves, is able to locate objects that reradiate the electromagnetic waves.

Within the scope of this Patent Application, by an antenna element one should understand each element which is developed to pick up electromagnetic waves and to convert them to an electrical signal. An antenna element may be developed, for example, as a copper surface on a circuit board. An antenna element may also be developed in a rod-shaped manner, or the like.

Within the scope of this Patent Application, by a radio signal one should understand each emitted or received electromagnetic wave.

Within the scope of this Patent Application, a processing device may be any electronic device which is able to perform calculations. This may be a microcontroller, for example, a microprocessor, a computer, an ASIC or the like.

Within the scope of this Patent Application, if formulas or calculations are explained and clarified in connection with the processing device, one should understand by this that the processing device performs these calculations at least logically. Thus, the processing unit may also utilize another calculation process or other forms of the formulas shown, particularly for the calculation by forms optimized by digital calculation devices. For instance, the calculations shown may also be carried out using complex numbers.

Within the scope of this Patent Application, the azimuth angle represents the angle in the horizontal plane between the longitudinal axis of the radar system, or of the vehicle which carries the radar system, and an object to be detected.

Within the scope of this Patent Application, the angle of elevation represents the angle in the vertical plane, between the longitudinal axis of the radar system or the vehicle which carries the radar system, and an object to be detected.

By a function of the maximum probability, one should understand, within the scope of this Patent Application, a so-called Deterministic Maximum Likelihood Method. Such a function becomes maximal when the correlation between a multitude of antenna diagrams, stored on the respective antenna array, and the radio signal received is at its greatest.

By a vehicle one should understand, within the scope of this Patent Application, every sort of vehicle, whether an airplane, land-based vehicle or water vehicle.

Figure 1:
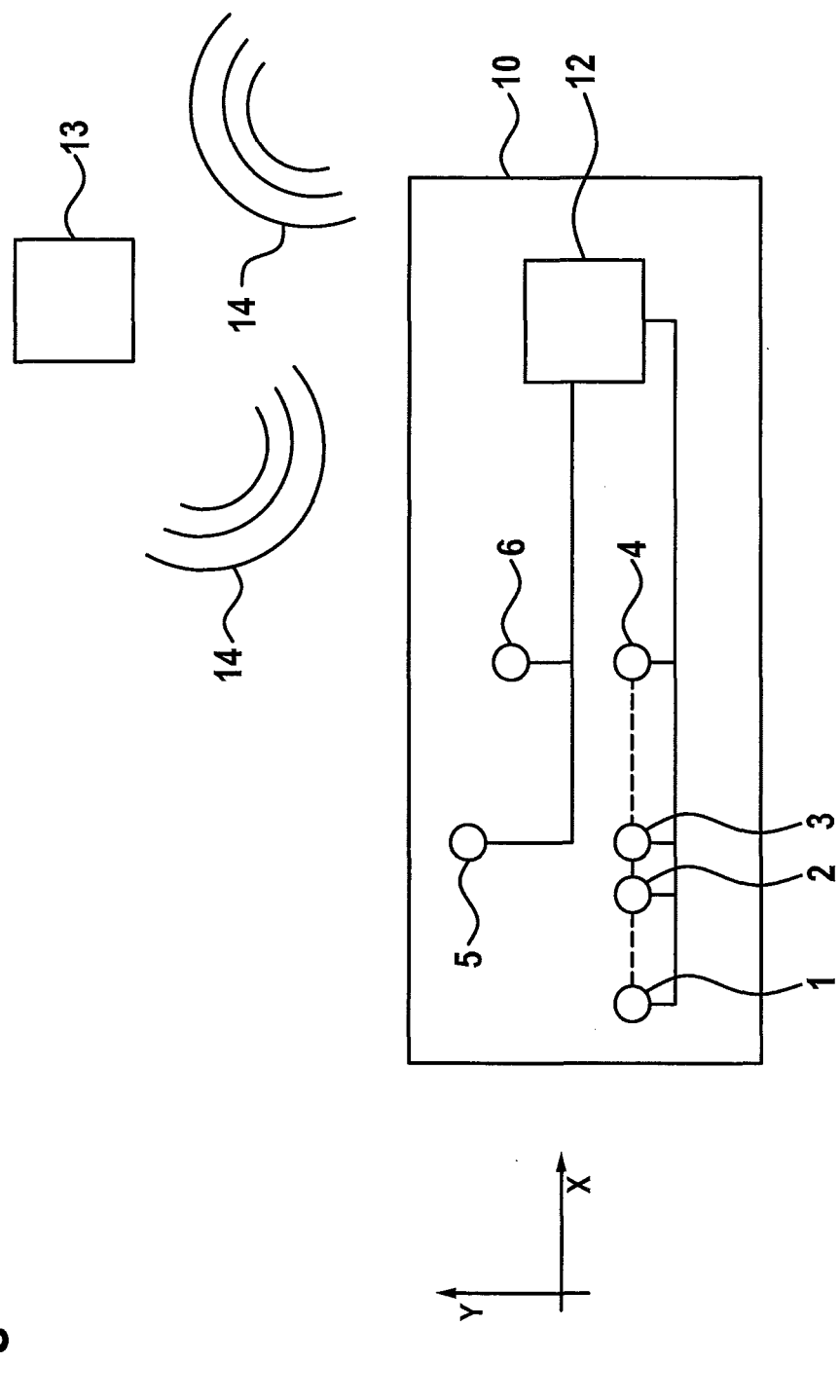
FIG. 1 shows a block diagram of one specific embodiment of an antenna array according to the present invention.

FIG. 1 shows a block diagram of a specific embodiment of an antenna array 10 according to the present invention.

Antenna array 10 has four first antenna elements 1-4, which are situated in a row, horizontally in the X direction. Furthermore, antenna array 10 has two second antenna elements 5 and 6. Second antenna element 5 is situated in the Y direction vertically above third antenna element 3, and second antenna element 6 is situated in the Y direction vertically above fourth antenna element 3.

In the exemplary execution of FIG. 1, the distance between first antenna element 1 and first antenna element 2 is approximately twice as great as the distance between first antenna element 2 and first antenna element 3. Furthermore, the distance between first antenna element 3 and fourth antenna element 4 is approximately twice as great as the distance between first antenna element 1 and first antenna element 2.

The distance between second antenna element 5 and first antenna element 3 corresponds approximately to the distance between first antenna element 3 and first antenna element 4. The distance between second antenna element 6 and first antenna element 4 approximately corresponds to the distance between first antenna element 1 and first antenna element 2.

The geometrical dimensions of second antenna elements 5 and 6, in this context, are so great in one specific embodiment that the distance between second antenna elements 5 and 6 and the corresponding first antenna elements 3 and 4 is greater than one-half the wavelength of first radio signal 14.

Antenna array 10 furthermore has a processing device 12, which is connected to first antenna elements 1-4 and second antenna elements 5 and 6. In FIG. 1, a first radio signal 14 is also shown, which is reflected by an object 13 in the direction of first antenna element 1-4 and second antenna element 5 and 6.

From radio signal 14, reflected by object 13 and received by first antenna elements 1-4 and second antenna elements 5 and 6, processing device 12 calculates the azimuth angle and the angle of elevation of object 13 with respect to the origin of the X-Y plane, in which antenna array 10 is located. In one specific embodiment, the origin of the X-Y plane lies in the geometrical average of first antenna element 1-4 and second antenna element 5 and 6. As a result, the object lies in the Z direction with respect to the X-Y plane of antenna array 10 that is not drawn in FIG. 1.

In one specific embodiment, processing device 12 may, for instance, first calculate the azimuth angle of object 13 and substitute it into formula:

$$\varphi_i = \frac{2\pi}{\lambda}(x_i * \sin\theta * \cos\Phi + y_i * \sin\Phi)$$

Consequently, all variables with the exception of angle of elevation $\Phi$ are known, and it is able to be calculated by simply solving the formula for the various antenna elements i.

The calculation of the azimuth angle is known to one skilled in the art, and may take place, for example, with the aid of the Deterministic Maximum Likelihood Method or by a correlation between first radio signals 14 received by first antenna elements 1-4 and the antenna diagrams determined and stored for respective antenna array 10.

In one further specific embodiment, the determination of the angle of elevation takes place not directly from the above equation but with the aid of the Deterministic Maximum Likelihood Method. In this context, the θ-dependent portion of the receive signal is corrected as follows: The values of the estimated azimuth angle are selected from the horizontal antenna diagrams normalized to 0 degrees and the signals of all receiving channels are divided by these values which are to be used for the calculation of the angle of elevation.

For the reception signal at the individual antenna elements, the following equation applies:

$$\underline{x} = c \cdot \underline{a}(\theta, \phi)$$

where c is a complex scalar and $\underline{a}(\theta,\Phi)$ is the control vector and antenna diagram vector for angle θ, $\Phi$.

As a rule, no 3D antenna diagrams are taken, but only horizontal)($\Phi=0°$) or vertical) (θ=0°) antenna diagram sections.

The angle of elevation estimate is thus to be carried out with the knowledge of $\underline{a}(\theta=0°, \Phi)=\underline{a}_{vert}(\Phi)$. In the ideal case, $\underline{a}(\theta, \Phi)$ may be decomposed into $\underline{a}_{hor}(\theta)\odot\underline{a}_{vert}(\phi)$ where $\odot$ represents symbolically the element-wise multiplication. Thus the following also applies:

$$\underline{x} = c \cdot \underline{a}_{hor}(\theta) \odot \underline{a}_{vert}(\phi),$$

Now, if one normalizes each element of receive signal x with the associated value of the horizontal antenna diagram on estimated azimuth angle θ, the following applies:

$$x_i \frac{a_{hor,i}(0°)}{a_{hor,i}(\hat{\theta})} \approx a_{vert,i}(\phi)$$

As a result, after the normalization, the estimate of the angle of elevation can be carried out only with the knowledge of $\underline{a}(\theta=0°, \Phi)$.

In one alternative specific embodiment, this correction may also be carried out on antenna diagram vectors (or the control vectors). Such a correction is carried out for each angle of elevation $\Phi$.

One further possibility of determining the angle of elevation is the averaging of functions of the maximum probability, and also carrying out Deterministic Maximum Likelihood Functions or DML functions. In this context, the DML function represents a correlation between received radio signals 14 and an antenna diagram determined and stored for the respective antenna array 10. The DML function is selected so that it becomes a maximum for that particular antenna diagram for which the angle of elevation best corresponds to the angle of elevation of object 13.

Since the distance of second antenna elements 5 and 6 from first antenna elements 3 and 4 is always greater than one-half the wavelength of first radio signal 14, no clear assignment of the angle of elevation is able to take place by a correlation with only one of the first radio signals 14 received by one of the second antenna elements 5 and 6, since the phase shift at respective second antenna element 5 and 6 could be greater in absolute amount than m.

For this reason, processing device 12 carries out this correlation, both for a combination of first antenna element 3 with second antenna element 5 and for a combination of first antenna element 4 with second antenna element 6. Based on these two correlations, processing device 12 is thereupon able to determine the angle of elevation.

For this, an averaged DML function is formed from the two DML functions, one DML function for a combination of first antenna element 3 with second antenna element 5 and one DML function for a combination of first antenna element 4 with second antenna element 6. The averaged DML function then has a maximum at that angle which corresponds to angle of elevation $\Phi$ of object 13.

Figure 2:
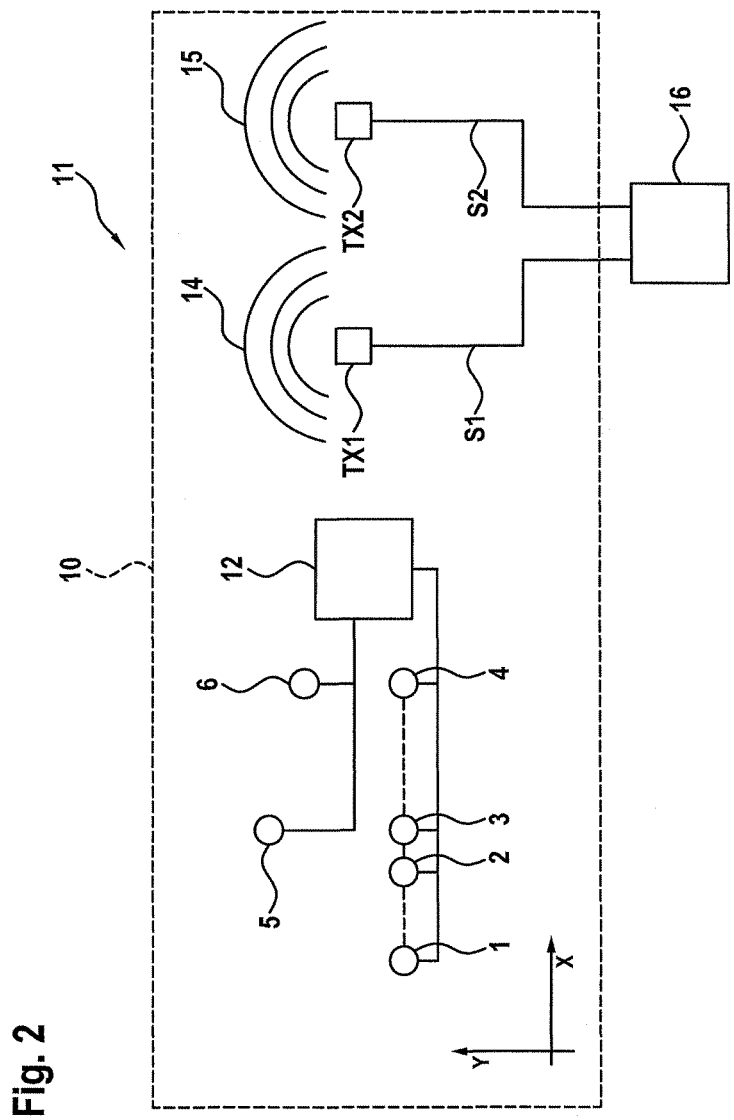
FIG. 2 shows a block diagram of a specific embodiment of a radar system according to the present invention.

FIG. 2 shows a block diagram of a specific embodiment of a radar system 11 according to the present invention.

Radar system 11 has an antenna array 10 based on antenna array 10 of FIG. 1, and a first sending device TX1 as well as a second sending device TX2. In this context, first sending device TX1 sends out a first radio signal 14 and second sending device TX2 sends out a second radio signal 15.

Furthermore, radar system 11 has an electronic system 16 which generates a signal S1, S2 respectively for first sending device TX1 and for second sending device TX2, which the two latter emit as the corresponding first radio signal 14 and the corresponding second radio signal 15.

Electronic system 16 generates a typical radar modulation, such as, for instance, a pulse-Doppler-radar, a constant frequency (CW (continuous wave)), one or more slow linear frequency ramps (FMCW (frequency modulated continuous wave)) or many fast frequency ramps (Chirp Sequence Modulation).

The antenna array of FIG. 2 is an antenna array according to the MIMO principle. MIMO stands for Multiple Input Multiple Output. An antenna array according to the MIMO principle has a higher aperture than a simple SIMO antenna array.

As a result, the use of an antenna array 10 according to the MIMO principle enables one to achieve higher accuracy.

By using the MIMO principle, one obtains a virtual SIMO antenna array having an enlarged aperture by the sending aperture as compared to the pure receiving antenna array. The number of virtual receiving channels $N_{virt}$ scales, in this context, with the number of sending antennas $N_{tx}$, that is, $N_{virt}=N_{tx}*N_{rx}$. Aside from the increased number of channels, all the calculations remain valid and may be transferred directly to the MIMO principle.

Figure 3:
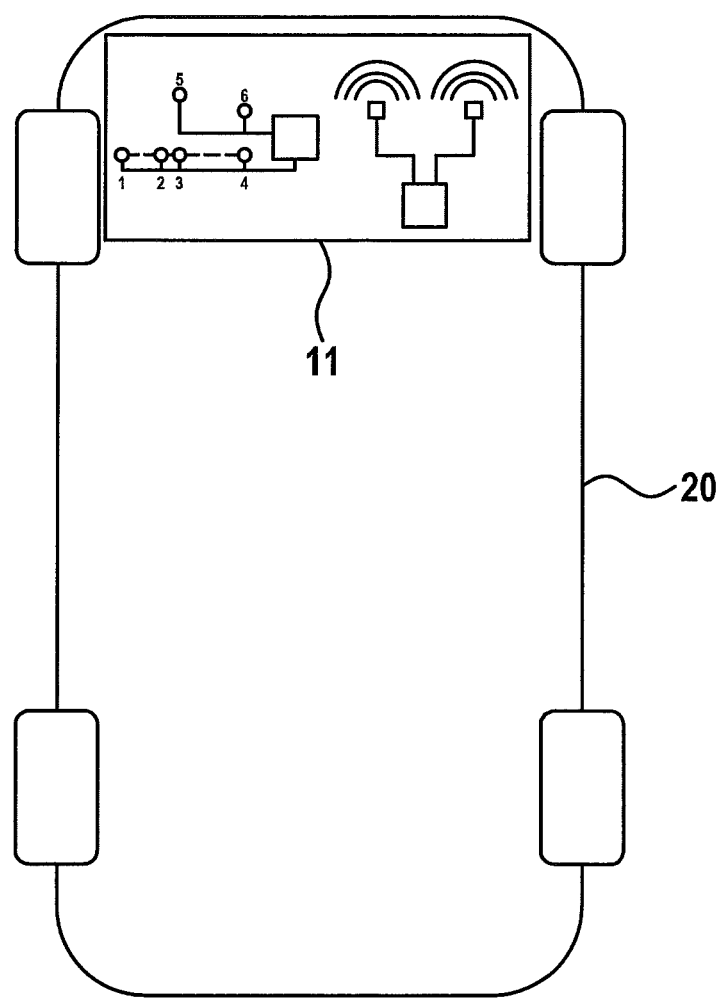
FIG. 3 shows a block diagram of a specific embodiment of a vehicle according to the present invention.

FIG. 3 shows a block diagram of a specific embodiment of a vehicle 20 according to the present invention.

Vehicle 20 has a single radar system 11, as is shown in FIG. 2. In this context, radar system 11 is situated at the front of vehicle 20. However, in a further specific embodiment, radar system 11 may also be positioned at the rear end of the vehicle or at the sides of vehicle 20.

In further specific embodiments, vehicle 20 has more than one radar system 11. For example, vehicle 20 may have a radar system 11 which is situated at the front of vehicle 20, and have a radar system 11 which is situated at the rear end of vehicle 20.

Figure 4:
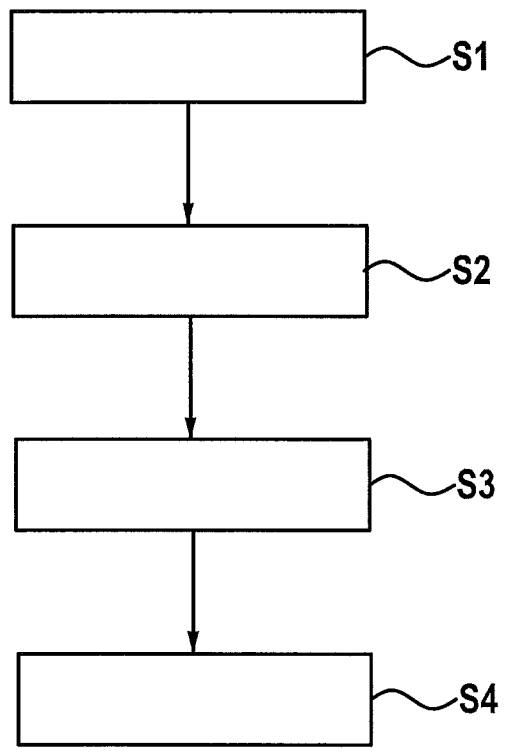
FIG. 4 shows a flow chart of a specific embodiment of a method according to the present invention.

FIG. 4 shows a flow chart of a specific embodiment of a method according to the present invention.

In a first step S1, a first radio signal 14 having a first sending device TX1 is sent out, first sending device TX1 being situated in a horizontal plane with first antenna elements 1-4.

A second step S2 provides for receiving radio signal 14 with first antenna elements 1-4.

In a third step S3, radio signal 14 is received using second antenna elements 5 and 6, which are situated in different horizontal positions, in each case above or below corresponding first antenna elements 1-4 of horizontally situated first antenna elements 1-4.

Fourth step S4 provides the calculating of an azimuth angle and an angle of elevation of an object 13 located in front of first antenna elements 1-4 and second antenna elements 5 and 6, from radio signal 14 received by first antenna elements 1-4 and from radio signal 14 received by second antenna elements 5 and 6.

In one specific embodiment, in fourth step S4, the azimuth angle of object 13 is first calculated, and this is then substituted into formula:

$$\varphi_i = \frac{2\pi}{\lambda}(x_i * \sin\theta * \cos\Phi + y_i * \sin\Phi)$$

Consequently, all variables with the exception of angle of elevation $\Phi$ are known, and it is able to be calculated by simply solving the formula for the various antenna elements i.

The calculation of the azimuth angle may be carried out as was described above.

In one additional specific embodiment, the determination of the angle of elevation does not take place directly from the above equation, but with the aid of the Deterministic Maximum Likelihood Method, as described above.

In one further specific embodiment, the calculation of the angle of elevation may be carried out as described above, based on averaging DML functions.

In one further specific embodiment, during sending out SI of radio signal 14, a second radio signal 15 may be sent out. This may particularly take place for an antenna array according to the MIMO principle. Similarly, during receiving S2 by first antenna elements 1-4 and during receiving S3 by second antenna elements 5 and 6, first radio signal 14 and second radio signal 15 are received.

Calculation S4 of the azimuth angle and of the angle of elevation then takes place based on the first received radio signal 14 and second received radio signal 15, as was described above.

Figure 5:
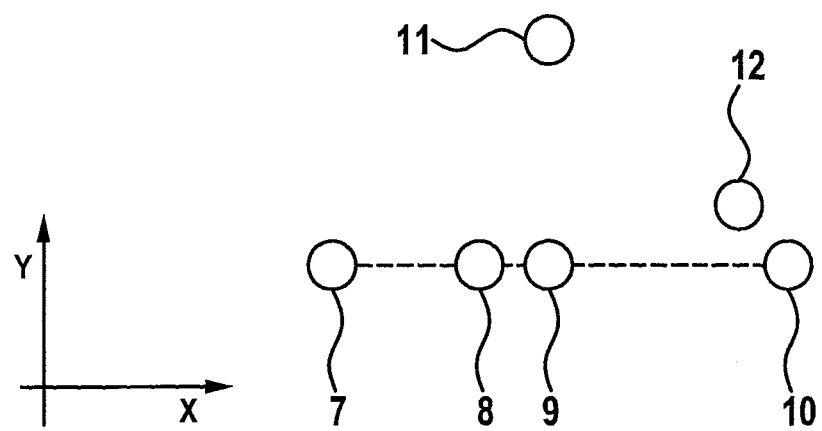
FIG. 5 shows a block diagram of one specific embodiment of an antenna array according to the present invention.

FIG. 5 shows a block diagram of a specific embodiment of an antenna array 10 according to the present invention.

FIG. 5 shows only first antenna elements 7-10 and second antenna elements 11 and 12. The positions of first antenna elements 7-10 and second antenna elements 11 and 12 differ from the positions of first antenna elements 1-4 and second antenna elements 5 and 6 of FIG. 1.

The distance between first antenna elements 7 and 8 is equal to the distance between first antenna elements 8 and 9. The distance between first antenna element 9 and first antenna element 10 is approximately as great as the distance between first antenna element 7 and first antenna element 9.

The vertical distance between second antenna element 11, which is situated above first antenna element 8, and first antenna element 8 is approximately as great as the distance between first antenna element 7 and first antenna element 9.

Second antenna element 12 is not situated directly above first antenna element 10, but is situated to the left and at an angle above first antenna element 10. The distance between second antenna element 12 and first antenna element 10 amounts to approximately one-half of the distance between first antenna element 7 and first antenna element 8.

Antenna array 10 of FIG. 5 is an alternative antenna array, which may also be used for calculating the azimuth angle of an object 13.

Figure 6:
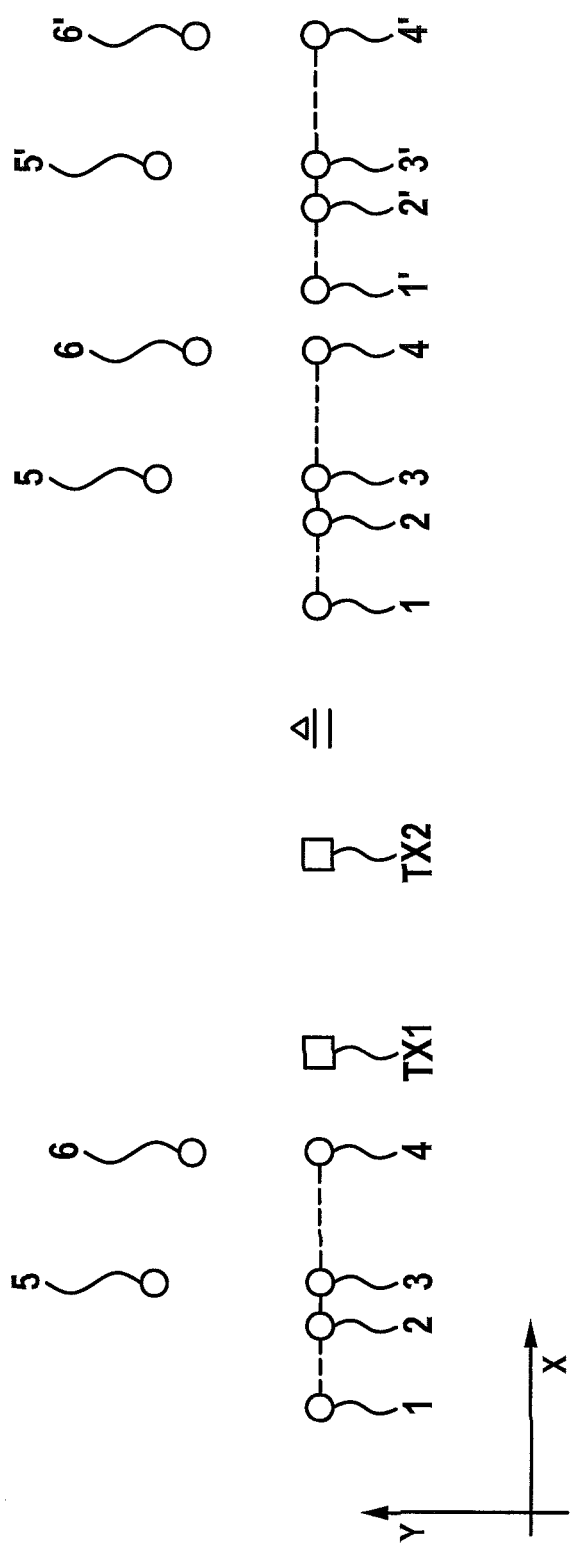
FIG. 6 shows a block diagram of one specific embodiment of an antenna array according to the present invention.

FIG. 6 shows a block diagram of a specific embodiment of an antenna array 10 according to the present invention.

The antenna array according to FIG. 6 corresponds to the antenna array of FIG. 2. FIG. 6 shows only first antenna elements 1-4, second antenna elements 5 and 6 as well as first sending device TX1 and second sending device TX2. On the right side of FIG. 6 there is shown which usual antenna array 10 comes about by using the MIMO principle. In this context, the positioning described above of first antenna elements 1-4 and second antenna elements 5 and 6 is shown in duplicate. The reference numerals are shown in this case with and without prime symbols. In this context, the distance of the two representations corresponds to the distance between first sending device TX1 and second sending device TX2.

Figure 7:
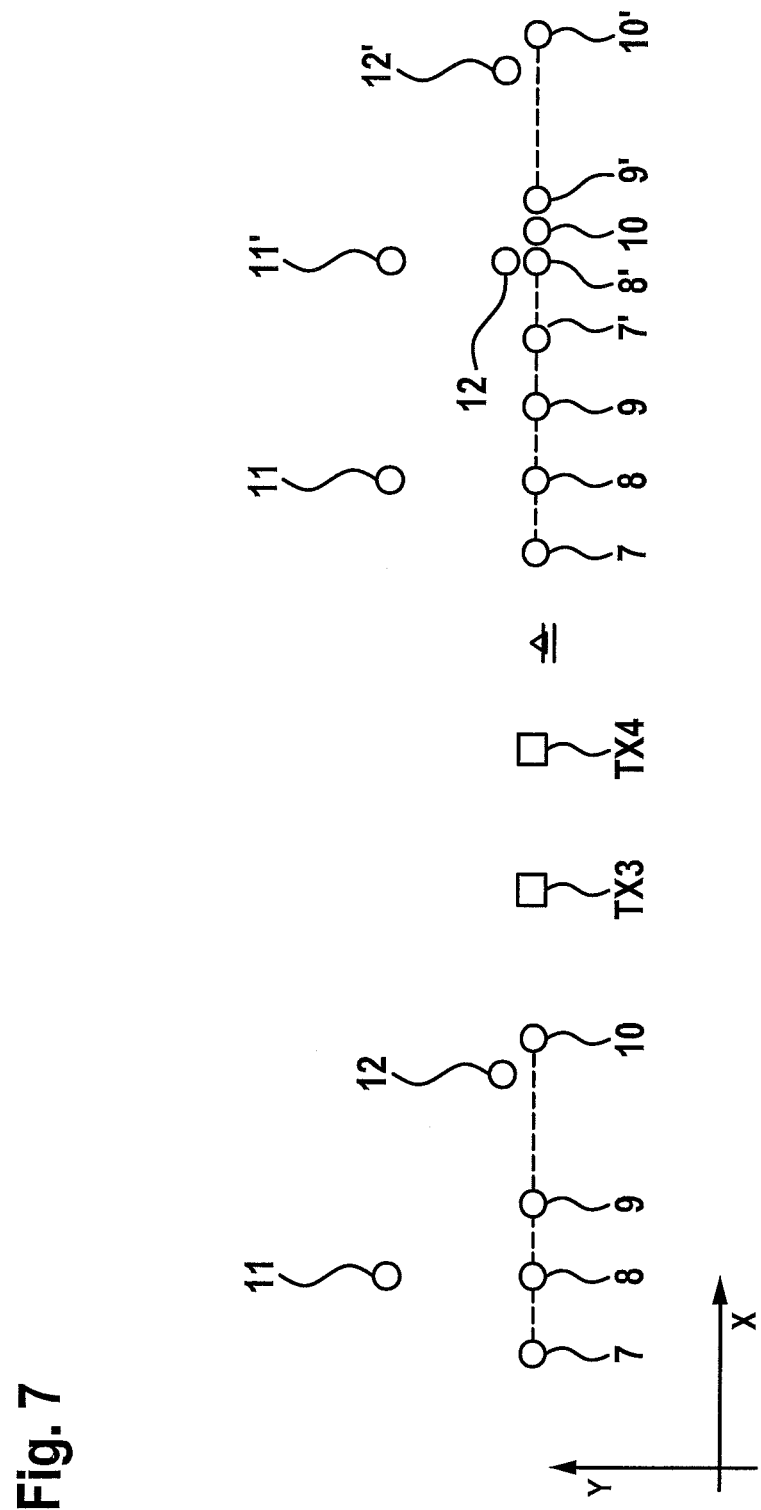
FIG. 7 shows a block diagram of one specific embodiment of an antenna array according to the present invention.
Figure 8:
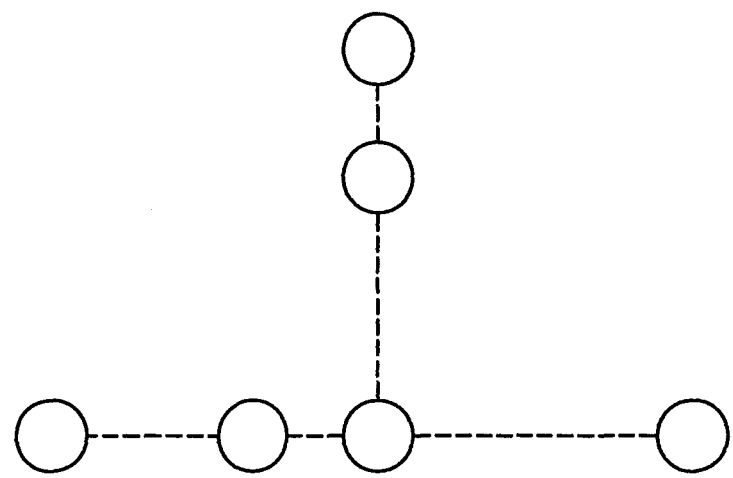
FIG. 8 shows a block diagram of a specific embodiment of a known antenna.

FIG. 7 shows a block diagram of a specific embodiment of an antenna array 10 according to the present invention.

FIG. 7 shows, same as FIG. 6 for antenna array 10 of FIG. 2, for antenna array 10 of FIG. 5 the usual antenna array 10 which comes about for the MIMO antenna of FIG. 5.

In this context, the distance between first sending device TX3 and second sending device TX4 is less than in the illustration of FIG. 6. As a result, the illustrations of the antenna arrays overlap on the right side of FIG. 7.

In the present description we have described concrete antenna arrays. It should be pointed out, however, that the method and the principal procedure of the present invention may be carried out with a number of different antenna arrays.

Although the present invention has been described above with the aid of exemplary embodiments, it is not restricted to these, but may be modified in many ways. In particular, the present invention may be changed or modified in diverse ways without deviating from the crux of the present invention.

What is claimed is:

1. An antenna array, for a radar system, comprising:
    at least two first antenna elements situated in horizontal direction in a plane and which are configured to receive a first radio signal;
    at least two second antenna elements situated in different horizontal positions in each case above or below the horizontally situated first antenna elements and which are configured to receive the first radio signal; and
    a processing device to calculate an azimuth angle and an angle of elevation of an object located in front of the antenna array, from the first radio signal received by the first antenna elements and from the first radio signal received by the second antenna elements;
    wherein each of the second antenna elements is situated in a vertical direction above a corresponding one of the first antenna elements, and wherein each of the second antenna elements is situated at a different height above the corresponding one of the first antenna elements, relative to one other.

2. The antenna array of claim 1, wherein at least one of second antenna elements is situated in a vertical direction next to a corresponding one of the first antenna elements.

3. The antenna array of claim 1, further comprising:
    a first sending device to send out the first radio signal, wherein the first sending device is situated in the plane of the first antenna element.

4. The antenna array of claim 3, further comprising:
    at least one second sending device to send out a second radio signal, the second sending device being situated in the plane of the first antenna element at a different horizontal position than the first sending device;
    wherein the first antenna element and the second antenna elements are configured to receive the second radio signal.

5. The antenna array of claim 1, wherein the processing device is configured to calculate the azimuth angle at least based on the radio signal received by the first antenna elements, and wherein the processing device is configured to calculate the angle of elevation based on the calculated azimuth angle and the radio signal received by the first antenna elements and the radio signal received by the second antenna elements.

6. The antenna array as recited in claim 1, wherein a distance between each of the second antenna elements and its corresponding one of the first antenna elements is greater than one-half the wavelength of the first radio signal.

7. The antenna array as recited in claim 6, wherein the processing device determines a correlation between the first radio signal received by each of the second antenna elements and the first radio signal received by its corresponding one of the first antenna elements, and determines the angle of elevation based on the correlations.

8. An antenna array, for a radar system, comprising:
    at least two first antenna elements situated in horizontal direction in a plane and which are configured to receive a first radio signal;
    at least two second antenna elements situated in different horizontal positions in each case above or below the horizontally situated first antenna elements and which are configured to receive the first radio signal; and
    a processing device to calculate an azimuth angle and an angle of elevation of an object located in front of the antenna array, from the first radio signal received by the first antenna elements and from the first radio signal received by the second antenna elements;
    wherein the processing device is configured to calculate the azimuth angle and the angle of elevation at least based on the first radio signal received by the first antenna elements and the radio signal received by the second antenna elements and based on a function which becomes maximal when a correlation between a multitude of antenna diagrams, stored on the antenna array, and the first radio signal received is at its greatest.

9. A radar system, comprising:
an antenna array, including;
at least two first antenna elements situated in horizontal direction in a plane and which are configured to receive a first radio signal;
at least two second antenna elements situated in different horizontal positions in each case above or below the horizontally situated first antenna elements and which are configured to receive the first radio signal, wherein each of the second antenna elements is situated in a vertical direction above a corresponding one of the first antenna elements, and wherein each of the second antenna elements is situated at a different height above the corresponding one of the first antenna elements, relative to one other; and
a processing device to calculate an azimuth angle and an angle of elevation of an object located in front of the antenna array, from the first radio signal received by the first antenna elements and from the first radio signal received by the second antenna elements; and
an electronic system to at least one of (i) generate a first signal which is sent out by the first sending device as the first radio signal, and (ii) generate at least one second signal which is sent out by the at least one second sending device as the second radio signal.

10. The radar system as recited in claim 9, wherein a distance between each of the second antenna elements and its corresponding one of the first antenna elements is greater than one-half the wavelength of the first radio signal.

11. The radar system as recited in claim 10, wherein the processing device determines a correlation between the first radio signal received by each of the second antenna elements and the first radio signal received by its corresponding one of the first antenna elements, and determines the angle of elevation based on the correlations.

12. A motor vehicle, comprising:
a radar system having an antenna array, including;
at least two first antenna elements situated in horizontal direction in a plane and which are configured to receive a first radio signal;
at least two second antenna elements situated in different horizontal positions in each case above or below the horizontally situated first antenna elements and which are configured to receive the first radio signal, wherein each of the second antenna elements is situated in a vertical direction above a corresponding one of the first antenna elements, and wherein each of the second antenna elements is situated at a different height above the corresponding one of the first antenna elements, relative to one other; and
a processing device to calculate an azimuth angle and an angle of elevation of an object located in front of the antenna array, from the first radio signal received by the first antenna elements and from the first radio signal received by the second antenna elements; and
an electronic system to at least one of (i) generate a first signal which is sent out by the first sending device as the first radio signal, and (ii) generate at least one second signal which is sent out by the at least one second sending device as the second radio signal.

13. The motor vehicle as recited in claim 12, wherein a distance between each of the second antenna elements and its corresponding one of the first antenna elements is greater than one-half the wavelength of the first radio signal.

14. The motor vehicle as recited in claim 13, wherein the processing device determines a correlation between the first radio signal received by each of the second antenna elements and the first radio signal received by its corresponding one of the first antenna elements, and determines the angle of elevation based on the correlations.

15. A method for detecting an object, using a radar system, the method comprising:
sending out a first radio signal using a first sending device, the first sending device being situated in a horizontal plane having at least two first antenna elements;
receiving the radio signal using at least two first antenna elements;
receiving the radio signal using at least two second antenna elements, which in different horizontal positions are each situated above or below corresponding first antenna elements of the horizontally situated first antenna element, wherein each of the second antenna elements is situated in a vertical direction above a corresponding one of the first antenna elements, and wherein each of the second antenna elements is situated at a different height above the corresponding one of the first antenna elements, relative to one other; and
calculating an azimuth angle and an angle of elevation of an object located in front of the first antenna elements and the second antenna elements from the first radio signal received by the first antenna elements and from the first radio signal received by the second antenna elements.

16. The method of claim 15, wherein during the calculating, the azimuth angle is calculated based on the radio signal received by the first antenna elements, and wherein during the calculating, the angle of elevation is calculated based on the calculated azimuth angle and based on the radio signal received by the first antenna elements and the radio signal received by the second antenna elements.

17. The method of claim 15, wherein at least one second radio signal is sent out using a second sending device, and wherein during the calculating, the azimuth angle and the angle of elevation are calculated based on the radio signals received by the first antenna elements and the radio signals received by the second antenna elements.

18. The method as recited in claim 15, wherein a distance between each of the second antenna elements and its corresponding one of the first antenna elements is greater than one-half the wavelength of the first radio signal.

19. The method as recited in claim 18, wherein the calculating of the angle of elevation includes determining a correlation between the first radio signal received by each of the second antenna elements and the first radio signal received by its corresponding one of the first antenna elements, and determining the angle of elevation based on the correlations.

20. A method for detecting an object, using a radar system, comprising:
sending out a first radio signal using a first sending device, the first sending device being situated in a horizontal plane having at least two first antenna elements;
receiving the radio signal using at least two first antenna elements;
receiving the radio signal using at least two second antenna elements, which in different horizontal positions are each situated above or below corresponding first antenna elements of the horizontally situated first antenna element; and
calculating an azimuth angle and an angle of elevation of an object located in front of the first antenna elements and the second antenna elements from the first radio signal received by the first antenna elements and from the first radio signal received by the second antenna elements;

wherein during the calculating, the azimuth angle and the angle of elevation are calculated based on the first radio signal received by the first antenna element and the first radio signal received by the second antenna elements and based on a function which becomes maximal when a correlation between a multitude of antenna diagrams, stored on the antenna array, and the first radio signal received is at its greatest.

* * * * *